United States Patent Office 3,171,047
Patented Feb. 23, 1965

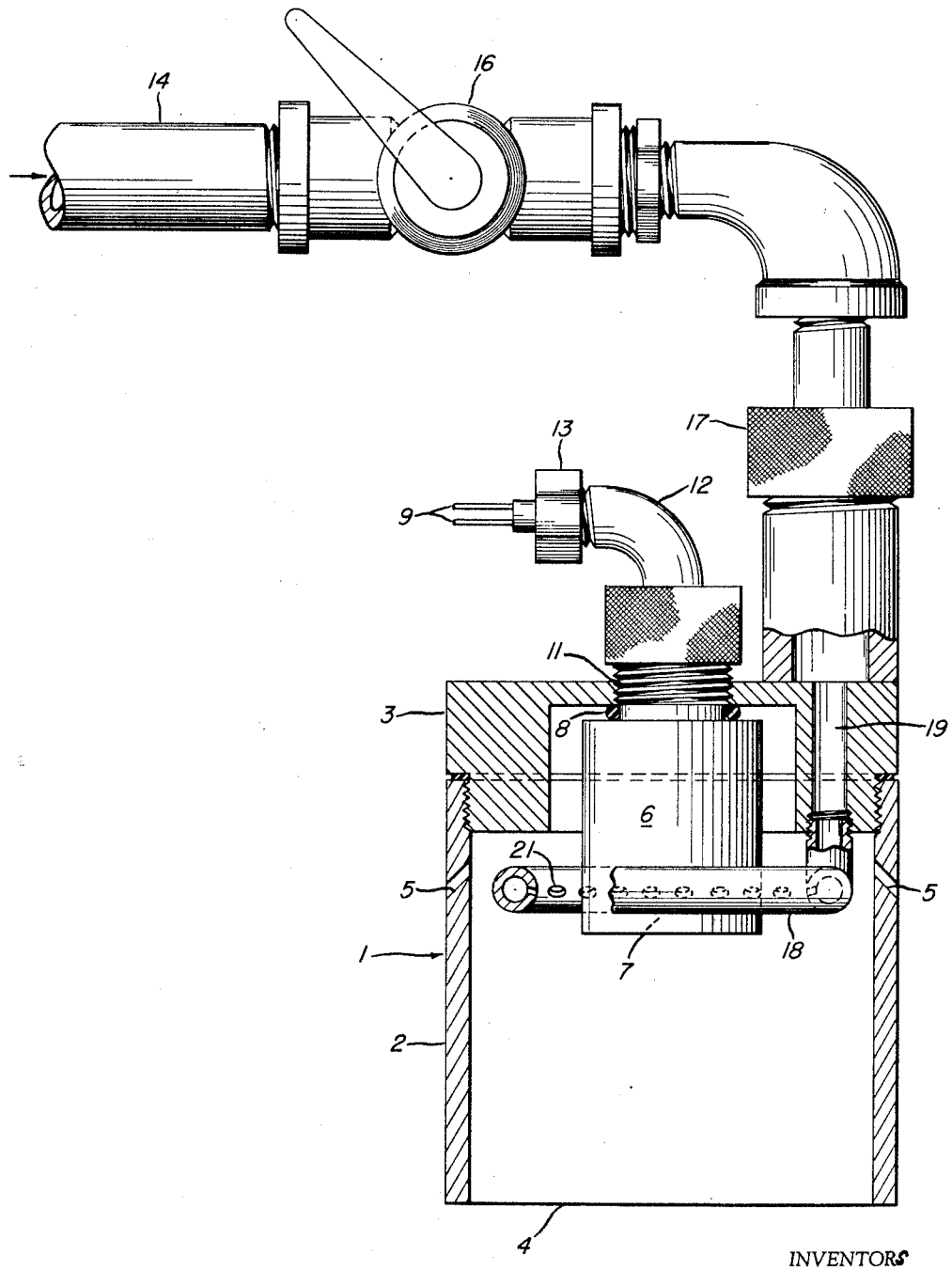
INVENTORS
Jack N. Bergman
Bernard Ostrofsky

3,171,047
ULTRASONIC INSPECTION APPARATUS
Jack N. Bergman, Hammond, and Bernard Ostrofsky, Gary, Ind., assignors to Standard Oil Company, Chicago, Ill., a corporation of Indiana
Filed Sept. 4, 1962, Ser. No. 221,071
3 Claims. (Cl. 310—8.7)

This invention relates to an improvement in an apparatus for ultrasonic testing. More particularly, the invention concerns an apparatus for cooling and supplying a couplant to an ultrasonic transducer under elevated temperature conditions.

Ultrasonic inspection techniques are widely employed in industrial non-destructive testing of materials. Techniques such as an ultrasonic pulse-echo method permit rapid, accurate determinations of the thickness of materials, and detection of flaws in the material.

Advantageously, ultrasonic testing of conduits and vessels is conducted under on-stream conditions. Generally, the conduits and vessels are at high temperatures. Because of the deleterious affect of heat on piezoelectric and mechanical properties of crystals and crystal mountings, transducers for ultrasonic inspection cannot be directly contacted with a surface above about 300° F. To expand the use of ultrasonic inspection to high temperature equipment, fluid cooled transducer units are needed. In transducer units of the prior art, the introduction of a sufficient coolant to cool the crystals has adversely affected the sensitivity of the transducer. The introduction of the coolant by the means of the prior art creates static and increases the signal to noise ratio beyond the point where accurate measurements can be performed; particularly under high temperature conditions, which require substantial flow of coolant to the transducer.

It is an object of the present invention to provide an improved fluid cooled transducer unit, wherein the coolant acts as a couplant, which may be used at elevated temperatures. A further object of the invention is to provide an apparatus which substantially reduces interference resulting from the introduction of a coolant to the transducer crystal. Other objects will be apparent to those of skill in the art upon reading the detailed description of the apparatus of this invention.

The present invention provides a housing having an open base suitable for contacting the working face of a test material. A partially encased transducer crystal is mounted within the housing. There is provided a means for transmitting electrical energy to the crystal. A fluid carrying conduit having at least one aperture is provided for cooling the transducer crystal and supplying a liquid couplant between the crystal face and the working face of the test material. The transducer unit is particularly characterized by the relationship of the fluid carrying conduit to the transducer and transducer casing. The conduit is positioned about the transducer casing and arranged to project a stream of coolant on to the transducer casing between the exposed face of the transducer crystal and the opposite end thereof.

In a preferred embodiment, the present invention provides a housing. The housing comprises: a cylindrical replaceable shoe, open at one end, and a head which forms the closed end of the shoe. Inside the housing, rigidly mounted near the closed end thereof, is a partially encased transducer crystal. The exposed surface of the transducer crystal faces the open end of the shoe. Cables for transmitting electrical energy to the transducer crystal and for receiving impulses from the crystal are connected to the crystal through a liquid tight seal. A conduit delivers liquid to the housing. Inside the housing a tube having a plurality of apertures extends at least partially about the periphery of the transducer casing. The apertures of the tubing are positioned to direct a liquid, such as water, against the transducer casing just to the rear of the exposed face of the transducer. Preferably, the water strikes the transducer case at an oblique angle.

Referring to the figure, the housing 1 is comprised of a removable shoe 2, and a head 3 which closes one end of the shoe 2. The shoe 2 and head 3 are constructed of a material such as aluminum, steel, or stainless steel. Shoes having pre-shaped openings 4, which coincide with the shape of the working face of the material under test, should be provided. Coincidence between the working face of the test material and the curvature of the open end 4 of the shoe 2 prevents excessive loss of fluid through the openings between the shoe and the working face. The curvature of the open end 4 of each replaceable shoe 2 should be designed to maintain a constant distance between the crystal face and the working face of the test material. Otherwise, recalibration of the instrument will be necessary each time the shoe is changed. At a distance from the open end 4 of the shoe 2, and above the elevation of the exposed face of the transducer crystal 7, weep holes 5 are placed in the wall of the shoe. The holes 5 remove excess coolant fluid.

Inside the housing 1, mounted on the head 3, is a transducer casing 6 which partially encases a transducer crystal 7. Casing 6 is constructed of a material such as stainless steel. The crystal must have at least one exposed face and it should be aligned to face the opening 4. The crystal 7 is constructed of a piezoelectric material such as quartz, barium titanate, lead metaniobate, or lithium sulfate. A material insoluble in the coolant fluid is preferable. However, soluble piezoelectric materials may be encapsulated and used.

An O-ring 8 insures a water tight seal between the inside of the housing 1 and the cables 9 transmitting electrical energy to the crystal 7 and receiving impulses reflected to the crystal. The conduit 11, elbow 12, and coupling 13 form a protective cover for the cables 9.

Water for cooling the crystal 7 and for providing a couplant between the working face of the test material and the crystal 7 enters by the conduit 14. Valve 16 is arranged to conveniently control the flow of fluid through the conduit 14. The coupling 17 forms a water tight seal and permits rotation of the housing 1 about the conduit 14. Water is supplied to the tubing 18 from the conduit 14 through channel 19. Preferably, the tube 18 substantially encircles the periphery of the transducer casing 6. Tubing 18 is provided with a plurality of apertures 21 for directing a flow of water against the outer surface of the transducer casing 6 just to the rear of the exposed face of the transducer crystal 7. Optimumly, the stream of water impinge the transducer casing in a downwardly direction and at an oblique angle. Under high temperature conditions, where high flow rates are required, it is advantageous to employ a coalescer in the water supplying line of the transducer. The coalescer may employ a pervious screen which will also act as a filter.

A fiber pad may be positioned about the periphery of the cylindrical shoe to act as a dam to water flowing from the open end of the shoe. The pad should be shaped to coincide with the openings of the shoe, and may be held rigidly in place by a clamp. Care must be taken to avoid imposing the pad between the working face of the material and the open end of the shoe. Erroneous readings will be obtained due to the change in the distance between the crystal face and the working face of the test material.

The above described apparatus may be used with pulse-echo instruments such as the Sonoray or Reflectoscope. The apparatus may also be used with a transmission type apparatus utilizing a separate sending and receiving transducer. When transmission methods are employed, the herein described apparatus may be used as the transmitting unit, and a separate receiving transducer unit of similar design is used as a receiving unit. Basic components of a system for flaw detection and measuring by ultrasonic pulse-techniques consists of a pulse oscillator, a high frequency oscillator, a modulator, a transducer, receiver, an amplifier, a rectifier, a linear sweep generator, and a synchronizer. The arrangement of the electrical components and the method of using them is well known to persons of skill in the art. A detailed discussion of the arrangement of the electronic components may be obtained by a reference to "Non-destructive Testing Handbook," R. C. McMasters, editor, Society for "Non-destructive Testing," 1959, "Non-destructive Testing," W. J. McGonnagle, McGraw-Hill, 1961.

Prior to using the transducer unit, the instrument must be calibrated. A flat test block of known thickness may be used as a standard. The water-cooled transducer unit, using a shoe having a flat opening, is placed on the block and water allowed to flow. A multiple reflection pattern from the block is observed on the cathode ray tube face. The blank space, representing the path of the ultrasonic beam through the water column appears on the screen with the multiple reflection pattern. The distance of travel of the ultrasonic beam through the water column can be removed from the screen by adjustment of the delay control on the pulse-echo instrument. The instrument may now be calibrated, and thickness measurements and flaw detections made by the methods utilized in direct contact ultrasonic testing.

The apparatus of the present invention is operated by applying the shoe to the hot material under test with the fiber pad in position and water flowing. Water is the ultrasonic couplant, as well as the cooling medium; signals are not observed until a continuous water path between the working face of the test material and the transducer face is established.

To demonstrate the effectiveness of the water-cooled ultrasonic transducer unit of the present invention, the unit was tested on a 140,000 b.p.d. crude still while the still was on-stream. Lines up to 36 inches in diameter and operating at a temperature of 760° F. were inspected using the water-cooled unit of this invention. Thicknesses ranging from 0.28 to 1.00 inch were obtained. Thickness readings obtained with the water-cooled unit were later checked when the lines were cold using a direct contact ultrasonic transducer unit. Approximately 85% of the readings obtained with the direct contact transducer unit were within 0.01 inch of those obtained with the water cooled unit of this invention. Only one reading varied as much as 0.03 inch. Other ultrasonic instruments not employing the coolant injection system herein described were tested on hot equipment. The signal to noise ratio of these instruments was so high, reasonably accurate readings could not be taken.

To further illustrate the striking improvement of the apparatus of the present invention having a coolant injection conduit positioned peripherally about the transducer casing, the instrument was tested on a line operating at 1050° F. The instrument was in continuous working contact with the line for five minutes. Water flowed to the unit at a rate of 0.9 gallon per minute and the maximum temperature at the face of the transducer was 120° F. The static produced on the stream of the oscilloscope was negligible.

Although the invention is described by reference to specific embodiments, it is to be understood that these embodiments are non-limiting and presented only to teach the best mode contemplated for practicing the invention.

Having described our invention, we claim:

1. An ultrasonic testing apparatus for transmitting ultrasonic waves through a test material which comprises:
   a housing having an open base and a head, said head forming the closed end of said housing;
   a transducer casing rigidly mounted within said housing;
   a piezoelectric type crystal positioned within said casing, said transducer having at least one exposed face;
   means for supplying electrical energy to said crystal;
   means for supplying a liquid to said housing;
   a conduit having a plurality of apertures positioned within the housing to receive said liquid and direct a stream of said liquid against the transducer casing at a point to the rear of the exposed face thereof, thereby cooling said transducer and supplying a liquid to form a couplant between the crystal and the working face of a test material positioned adjacent to the open base of said housing.

2. An ultrasonic testing apparatus for transmitting ultrasonic waves through a test material which comprises:
   a housing including a shoe having an open base and a head, said head forming the closed end of said housing, said shoe being removably attached to said head;
   a transducer casing mounted within said housing;
   a piezoelectric type crystal positioned within said casing, said crystal having at least one exposed face, said transducer crystal and said transducer casing being positioned so that the exposed face of said transducer crystal faces the opening in said housing;
   means for supplying electrical energy to said crystal;
   means for supplying a liquid to said housing;
   a liquid carrying conduit for receiving said liquid, said conduit having a plurality of apertures, said conduit positioned about the transducer casing and arranged to direct a flow of liquid against the transducer casing just to the rear of the exposed face of the transducer crystal.

3. An ultrasonic testing apparatus for transmitting ultrasonic waves through a test material which comprises:
   a housing, said housing including a shoe having an open base and a head, said head forming the closed end of said housing, said shoe being removably attached to said head;
   a transducer casing rigidly mounted upon the head within said housing;
   a piezoelectric crystal positioned within said casing, said crystal having an exposed face which is aligned to face the opening at the base of said housing;
   means for supplying electrical energy to said crystal;
   conduit means for supplying a liquid to said housing;
   a liquid carrying conduit having a plurality of apertures, said conduit being positioned peripherally about the transducer casing, said apertures being arranged to direct a stream of liquid against the transducer casing just to the rear of the exposed face of the transducer crystal.

References Cited in the file of this patent
UNITED STATES PATENTS

| | | |
|---|---|---|
| 2,916,265 | Towne | Dec. 8, 1959 |
| 2,956,185 | Von Stocker | Oct. 11, 1960 |